US006253812B1

(12) United States Patent
Rinehart

(10) Patent No.: US 6,253,812 B1
(45) Date of Patent: Jul. 3, 2001

(54) WOOD TURNING TOOL

(75) Inventor: Timothy Rinehart, Parkersburg, WV (US)

(73) Assignee: Woodcraft Supply Corp., Parkersburg, WV (US)

( * ) Notice: Subject to any disclaimer, the term of this patent is extended or adjusted under 35 U.S.C. 154(b) by 0 days.

(21) Appl. No.: 09/406,888

(22) Filed: Sep. 28, 1999

(51) Int. Cl.⁷ .................. B27C 7/02; B23B 51/00
(52) U.S. Cl. ........................... 142/56; 408/227
(58) Field of Search ............... 142/56; 408/227, 408/228, 713; 407/42

(56) References Cited

U.S. PATENT DOCUMENTS

| D. 358,080 | 5/1995 | Handler ................... D7/509 |
|---|---|---|
| 622,461 | 4/1899 | Glardon-Jacquet . |
| 809,567 | 1/1906 | Henckel . |
| 2,660,039 | 11/1953 | Newell . |
| 2,914,098 | 11/1959 | McLennan . |
| 3,014,509 | 12/1961 | Cederblad . |
| 3,229,731 | 1/1966 | Hilton . |
| 3,393,819 | 7/1968 | Van De Walle . |
| 4,754,787 | 7/1988 | Smith ................... 142/56 |
| 4,924,924 | 5/1990 | Stewart ................... 142/49 |
| 4,998,572 | 3/1991 | Lukes ................... 142/55 |
| 5,137,065 | 8/1992 | Stewart ................... 142/56 |
| 5,190,418 | * 3/1993 | Nakayama et al. ........... 407/42 |
| 5,295,598 | 3/1994 | Gerlach et al. ........... 215/100 |
| 5,513,764 | 5/1996 | Harrison et al. ........... 215/372 |
| 5,626,446 | * 5/1997 | Ching ................... 408/227 |
| 5,682,933 | 11/1997 | Martel ................... 142/56 |
| 5,850,860 | 12/1998 | Memelink ................... 142/56 |

OTHER PUBLICATIONS

The Woodturners Catalog, Craft Supplies USA, p. 23, Oct. 1992.*

* cited by examiner

*Primary Examiner*—Steven C. Bishop
(74) *Attorney, Agent, or Firm*—Cesari and McKenna

(57) ABSTRACT

A wood turning tool has an elongated handle with an end and a blade mounted to that end. The blade is formed as a plow with top and bottom surfaces and a working edge extending between those surfaces and having an apex. The working edge has an undercut ground bevel forming with the blade top surface a first cutting edge on one side of the apex and an overcut ground bevel forming with the blade bottom surface a second cutting edge on the other side of said apex, each bevel having a selected bevel angle.

8 Claims, 1 Drawing Sheet

US 6,253,812 B1

WOOD TURNING TOOL

This invention relates to a turning tool for turning wood. It relates more particularly to a hand-held wood turning tool which is especially adapted to form a recess in a turning workpiece of wood.

BACKGROUND OF THE INVENTION

There are a variety of situations where one may want to form a recess in a workpiece. For example, the interior of a wooden goblet has a curved recess. Also, some goblets are designed with a glass parabola which sits in a recess atop a wooden base. Similar wooden bases are used to support bowls and other convex articles of one kind or another.

Conventionally, to form a recess in a workpiece, a cutting tool such as chisels, gougers and scrapers are used to permit relatively rapid rough cutting and scraping followed by a more careful surface finishing in order to form the recess in that article. The various tools are applied against the end of the workpiece which is being turned around its longitudinal axis. Invariably, these tools only engage the turning workpiece with one cutting edge at the downside of the workpiece rotation. Therefore, the user has to repeatedly check the progress of the recess with a template to be sure that it is symmetrical and centered on the turning axis. Needless to say, this makes the turning task somewhat tedious and time consuming.

Therefore, there is a need for a wood turning tool which can form precisely shaped recesses in wooden workpieces more efficiently than has been possible heretofore.

SUMMARY OF THE INVENTION

Accordingly, the present invention aims to provide a wood turning tool for forming a precisely shaped recess in a turning workpiece in a reliable and efficient manner.

Another object of the invention is to provide a turning tool of this type which is capable of cutting a recess in a turning workpiece to a finished form.

Another object of the invention is to require such a turning tool which eliminates the need for a template to check the accuracy of the recess as it is being formed in the workpiece.

A further object of the invention is to provide a wood turning tool whose working end functions as a template for the finished recess.

Other objects of the invention will, in part, be obvious and will, in part, appear hereinafter.

The invention accordingly comprises the features of construction, combination of elements and arrangement of parts which will be exemplified in the construction hereinafter set forth and the scope of the invention will be indicated in the claims.

Briefly, my turning tool has a front or working end formed as a flat blade of plow-like shape, the apex of the plow coinciding with the central longitudinal elevation or centerline of the blade. The top and bottom surfaces of the blade are flat and generally parallel to one another. By an undercut ground bevel on the front or working edge of the blade on one side of the elevation, a cutting edge is formed at the top surface of the blade. A second cutting edge is present on the opposite side of the elevation at the bottom surface of the blade due to an overcut ground bevel on the working edge of the blade on that side of the elevation.

In use, the tool is placed on a tool rest so that the apex of the plow engages the end of the turning workpiece at the axis of rotation thereof. As the workpiece rotates, the downwardly moving portions of the workpiece are engaged by the cutting edge at the top surface of the blade while the upwardly moving portions of the workpiece are engaged and cut by the cutting edge at the bottom surface of the blade. Thus, the tool removes twice as much material from the turning workpiece as a conventional turning tool with a single cutting edge.

Furthermore, having two cutting edges disposed on opposite sides of the blade apex at the axis of rotation of the workpiece, the tool is self-centering so that the apex of the plow tends to remain at the center of the workpiece. Resultantly, as the tool is advanced into the end of the workpiece, the recess formed by the tool remains symmetrical and centered on the turning axis during the entire turning process. This means that the recess formed in the workpiece will ultimately have the same shape as the tool blade. In other words, the tool itself functions as a template for the recess. By using tools with different plow curvatures, a variety of differently shaped recesses may be formed depending upon the purpose or function of the workpiece.

BRIEF DESCRIPTION OF THE DRAWING

For a fuller understanding of the nature and objects of the invention, reference should be had to the following detailed description taken in connection with the accompanying drawing, in which.

DETAILED DESCRIPTION OF AN ILLUSTRATIVE EMBODIMENT

Figure 1:
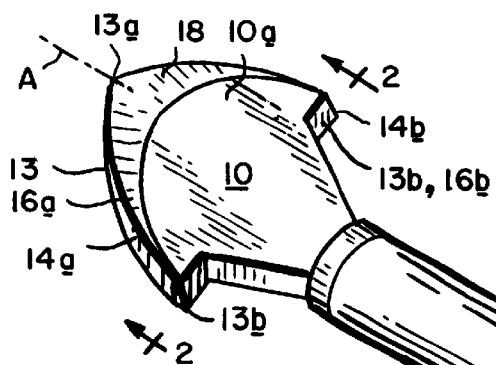
FIG. 1 is a fragmentary perspective view of a turning tool incorporating the invention.
Figure 2:
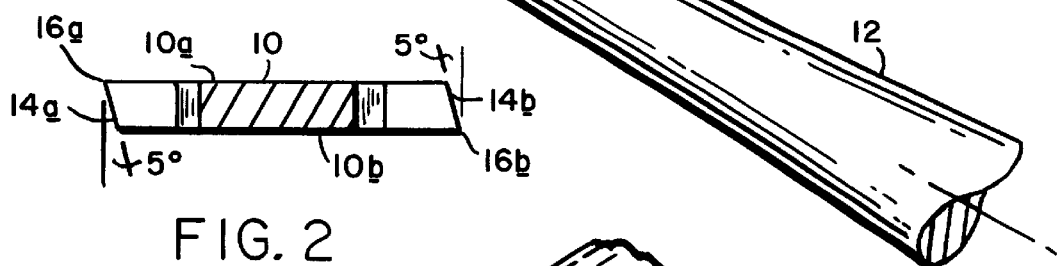
FIG. 2 is a sectional view taken along line 2—2 of FIG. 1.

Referring to FIG. 1 of the drawing, my turning tool comprises a generally flat blade 10 attached to the end of a relatively long handle 12. Blade 10 has a generally flat upper surface 10a and a flat lower surface 10b (FIG. 2) which is more or less parallel to surface 10a. The working edge 13 of blade 10a is formed as a plow with an apex 13a usually coinciding with the central longitudinal axis or elevation A of the blade and rear ends 13b disposed on opposite sides of that axis. The walls 14a and 14b comprising edge 13 on opposite sides of apex 13a are beveled so that, in cross section, the two walls are parallel as shown in FIG. 2 from apex 13a to the rear ends 13b of working edge 13. In other words, wall 14a has an undercut ground bevel and wall 14b has an overcut ground bevel. This forms a sharp cutting edge 16a at top surface 10a and another sharp cutting edge 16b at bottom surface 10b as best seen in FIG. 2. Thus, the front portion of blade 10 in cross section defines a parallelogram as shown in that figure. Preferably, each bevel angle is relatively small, in the range of 3° to 8°, the optimum angle being about 5° usually also, both bevels have the same bevel angle.

Preferably also, the leading edge margin of the blade top surface 10a is provided with a downward bevel 18 to reduce the blade mass at the working edge of the blade and to enable the user to see better the cutting edges 14a and 14b near the apex 13a of blade 10.

Figure 3:
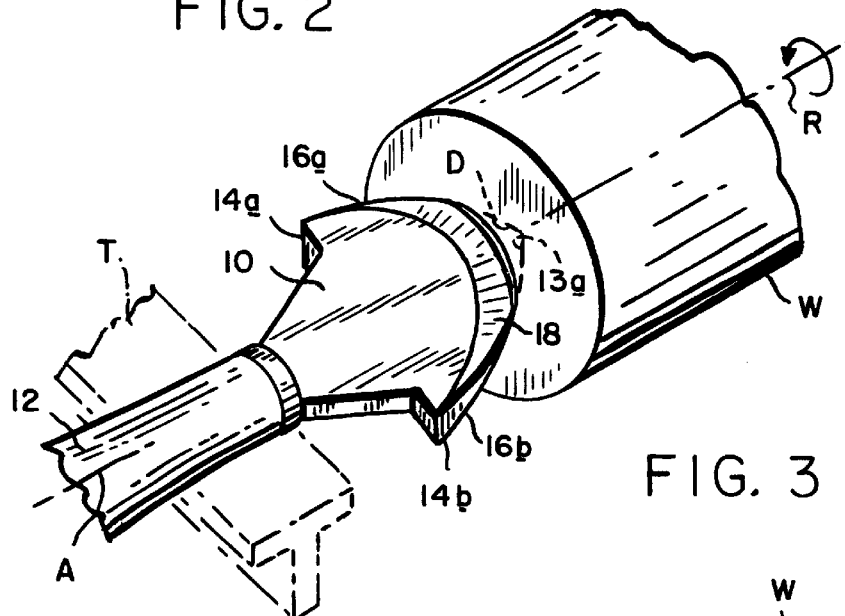
FIG. 3 is a fragmentary perspective view showing the FIG. 1 tool in use.
Figure 4:
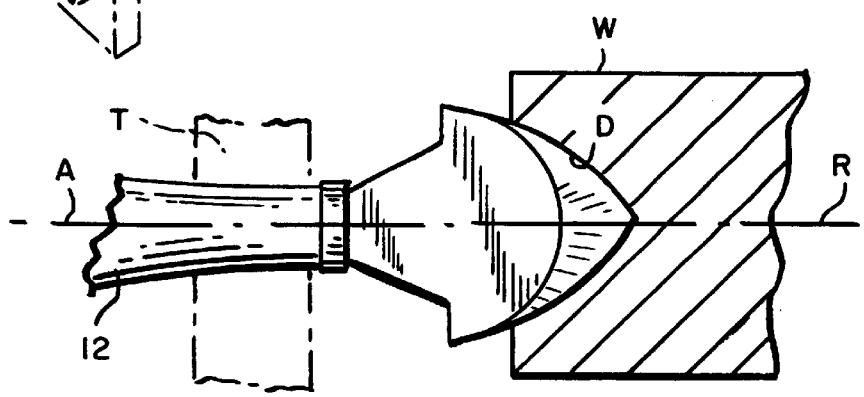
FIG. 4 is a sectional view taken along line 4—4 of FIG. 3.

Referring now to FIGS. 3 and 4, in order to use the tool to create a recess in the end of a turning workpiece W which is rotated counterclockwise about the longitudinal axis of the workpiece, the tool is placed on a tool rest T are so that the apex 13a of blade 10 engages the end of the workpiece at the axis of rotation R. Preferably, the tool and the workpiece are oriented relatively so that the axes A and R are more or less collinear as shown in FIGS. 3 and 4.

As the workpiece W is turned counterclockwise as shown in FIG. 3, the downwardly rotating portions of the workpiece encounter the cutting edge 16a to the left of the axis R as shown in FIG. 3 while the upwardly rotating portions of the workpiece are engaged by the cutting edge 16b to the right of axis R. Resultanly, a progressively increasing depression or recess D is cut into the end of the workpiece by blade 10.

By progressively moving the tool toward the workpiece, the recess cut into the end of the workpiece becomes progressively larger and deeper. Due to the fact that the tool blade 10 is formed as a plow with cutting edges at the top and the bottom of the tool on opposite sides of the apex of the plow, the tool tends to be self-centering. Therefore, as the tool is advanced toward the workpiece, the recess cut into the end of the workpiece remains symmetrical and centered on the turning axis R. Therefore, wood material is removed efficiently from the end of the workpiece by both blade edges 16a and 16b, with the recess being formed in the workpiece assuming the basic shape of the leading edge 13 of the tool blade 10. Accordingly, a relatively large finished recess can be cut in workpiece W in a minimum amount of time using a single tool and without requiring the use of a separate template.

The illustrated tool will form a recess which is more or less parabolic. By changing the shape of the working edge 13 of blade 10, recesses having oval, conical elliptical and hemispherical shapes may be formed in the workpiece.

It will thus be seen that the objects set forth above, among those made apparent from the preceding description, are efficiently attained. Also, since certain changes may be made in the above description or shown in the accompanying drawing, it is intended that all matter contained in the above description or shown in the accompanying drawing shall be interpreted as illustrative and not in a limiting sense.

It is also to be understood that the following claims are intended to cover all of the generic and specific features of the invention described herein.

What is claimed is:

1. A wood turning tool comprising an elongated handle having an end and a blade mounted to said end, said blade being formed as a plow with top and bottom surfaces and a working edge extending between said surfaces and having an apex and an axis extending between said surfaces to said apex, said blade top surface having a sloped surface adjacent to said working edge which extends downwardly toward said axis and said working edge having an undercut ground bevel forming with the blade top surface a first cutting edge on one side of the apex and an overcut ground bevel forming with the blade bottom surface a second cutting edge on the other side of said apex, each said bevel having a selected bevel angle.

2. The tool defined in claim 1 wherein said top and bottom surfaces are flat and parallel to one another.

3. The tool defined in claim 1 wherein the bevel angle of each bevel is in the range of 3° to 8°.

4. The tool defined in claim 2 wherein said bevels have substantially the same bevel angle.

5. The tool defined in claim 4 wherein the same bevel angle is 5°.

6. The tool defined in claim 1 wherein said blade has a longitudinal centerline and said apex coincides with said centerline.

7. The tool defined in claim 1 wherein said blade in lateral cross section defines a parallelogram.

8. The tool defined in claim 1 wherein said working edge has a shape selected from the group consisting of parabola, ellipse, cone, oval and hemisphere.

* * * * *